Figure 1:
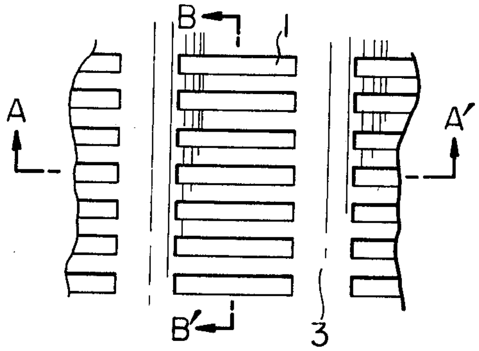

United States Patent [19]

Nagaoka

[11] 4,037,253

[45] July 19, 1977

[54] PRESSURE SENSITIVE SIGNAL REPRODUCING SYSTEM FOR A VIDEODISC

[75] Inventor: Tadashi Nagaoka, Nishinomiya, Japan

[73] Assignee: Matsushita Electric Industrial Co., Ltd., Osaka, Japan

[21] Appl. No.: 580,946

[22] Filed: May 27, 1975

[30] Foreign Application Priority Data

| | | |
|---|---|---|
| June 11, 1974 | Japan | 49-66900 |
| June 11, 1974 | Japan | 49-66901 |
| June 11, 1974 | Japan | 49-66915 |
| June 11, 1974 | Japan | 49-66917 |
| Mar. 10, 1975 | Japan | 50-29369 |
| Mar. 10, 1975 | Japan | 50-29370 |

[51] Int. Cl.[2] .......................... H04N 5/76; G11B 3/10; G11B 11/06

[52] U.S. Cl. ............................ 358/128; 179/100.41 P; 274/37; 179/100.4 C

[58] Field of Search ................ 179/100.41 P, 100.4 C, 179/100.4 M, 100.4 R, 100.41 P, 100.41 B; 274/37, 38; 178/6.6 R, 6.6 A, 6.6 TP; 340/173 TP; 358/128, 127

[56] References Cited

U.S. PATENT DOCUMENTS 3,055,989 9/1962 Bachman .................... 179/100.41 K

*Primary Examiner*—Bernard Konick
*Assistant Examiner*—Alan Faber
*Attorney, Agent, or Firm*—Stevens, Davis, Miller & Mosher

[57] ABSTRACT

A signal reproducing system particularly adapted to be used with a high frequency signal such as a video signal. In this system, a record medium formed with a guide groove having an uneven pattern formed on an inner wall thereof with projections of the uneven pattern being located at intervals corresponding to time-axis changes in a time-axis modulated signal is scanned by a scanning member. The record medium is pressed by the scanning member along the guide groove, the scanning member being supported by an essentially elastic material. A change in the inclination angle of the scanning member with respect to the record medium occurs when a portion of the tip end of the scanning member engages with or disengages from the projections. The change in inclination angle is detected by a mechanical-electrical transducing element arranged in contact with the scanning member as an electrical signal to produce a reproduced signal.

9 Claims, 20 Drawing Figures

PRESSURE SENSITIVE SIGNAL REPRODUCING SYSTEM FOR A VIDEODISC

The present invention relates to a recording and reproducing system in which a high frequency signal such as a video signal is recorded on a record medium consisting of resin or the like in the form of an engraved pattern. In this system when reproducing the record, the record medium is scanned by a scanning member to detect the displacement of the scanning member caused by the engraved pattern as an electrical signal.

A recording and reproducing system in which a signal is recorded on a record medium in the form of an engraved pattern and wherein, when reproducing the record, the displacement of a scanning member caused by the engraved pattern is detected as an electrical signal has been widely known in the field of audio record discs.

In such an audio record disc, the signal is recorded on the record medium in the form of an engraved pattern in accordance with the level of the audio signal, and when the signal is to be reproduced, the scanning member (reproducing stylus) scans along an outer periphery of the engraving. Accordingly, when a high frequency signal such as a video signal is recorded or reproduced, the scanning member cannot accurately follow the engraved pattern.

As an approach to resolve the above problem, a system as disclosed in the Japanese Patent Publication No. 12948/72 which corresponds to U.S. Pat. No. 3,652,809 has been proposed. In the proposed system, however, since the record medium (disc) is formed by a material having a small elastic modulus and the deformation of the engraved signal pattern on the record medium caused by the depression by the scanning member during scanning is utilized to detect the recorded signal, a relatively large depressing force of the scanning member to the record medium is necessarily required, resulting in substantial wear of the scanning member and/or record medium.

Furthermore, because of the principle of recording and reproduction employed, the proposed system requires special consideration to be paid to the contact between the reproducing stylus and the record medium (disc). In actual fact, the disc is of the sonosheet type having a diameter of 21 cm and a thickness of 0.1 mm, which is used while it is aerodynamically stabilized. As a result, the reproducing apparatus is complicated, the handling of the disc is inconvenient and the disc is frequently damaged during handling.

The present invention aims to overcome the above problems and it is a primary object of the present invention to provide a reproducing system which enables the reproduction of a high frequency signal with high quality from a record medium having a similar rigidity to that of a prior art audio record disc.

It is another object of the present invention to provide an effective means for mounting a mechanical-electrical transducing element to a scanning member, the mechanical-electrical transducing element detecting a signal in accordance with the vibration of the scanning member which is vibrated in accordance with an engraved signal pattern on the record medium.

Figure 2:
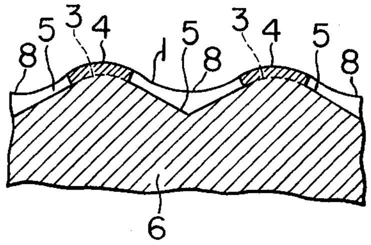
Figure 3:
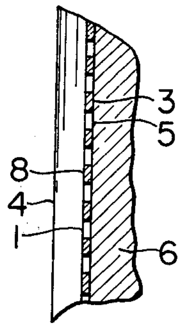
Figure 4:
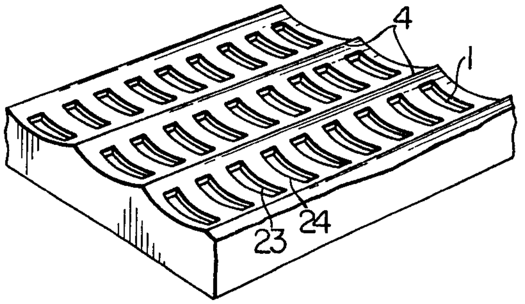
Figure 5:
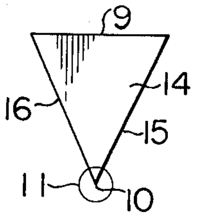
Figure 6:
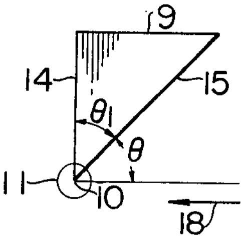
Figure 7:
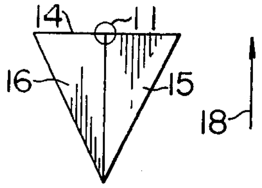
Figure 8:
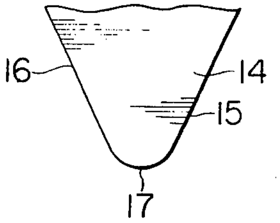
Figure 9:
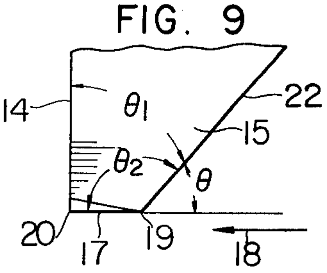
Figure 10:
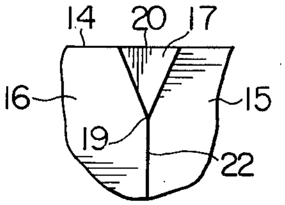
Figure 11:
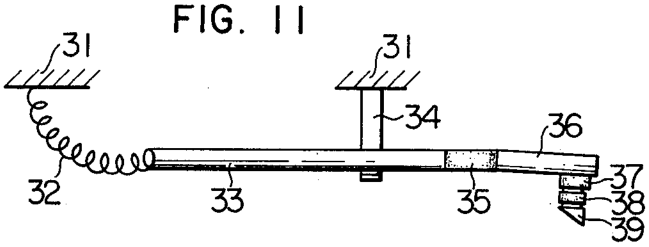
Figure 12:
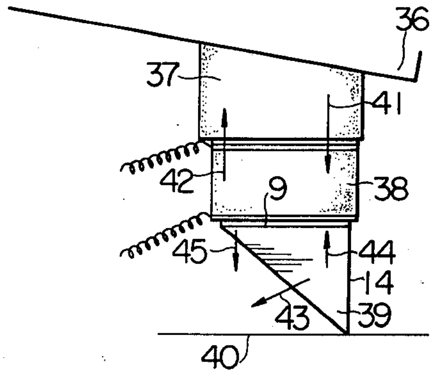
Figure 13A:
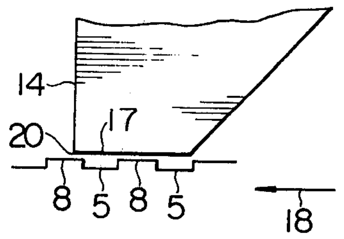
Figure 14A:
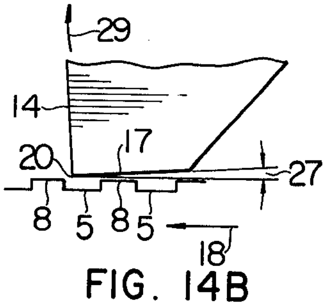
Figure 13B:
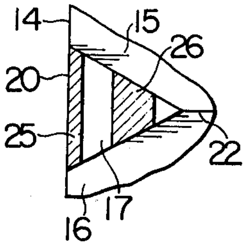
Figure 14B:
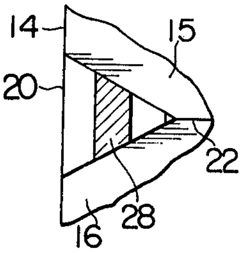
Figure 15:
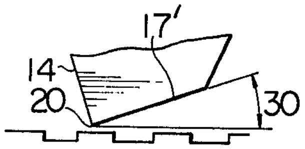
Figure 16:
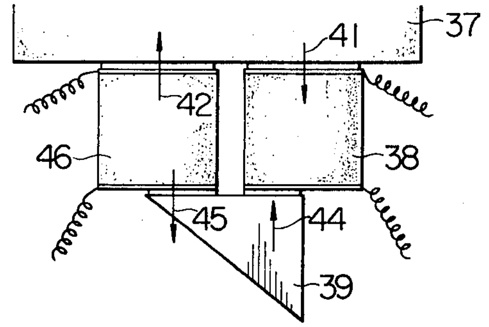
Figure 17:
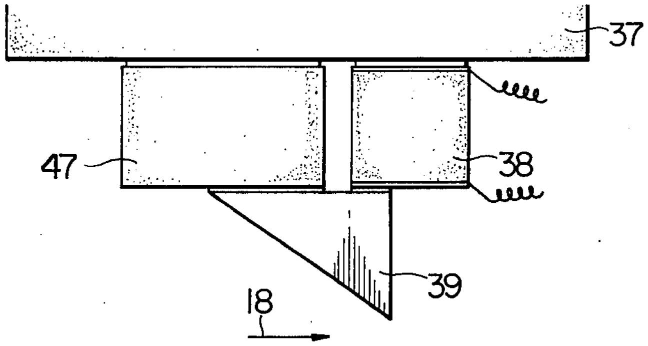
Figure 18:
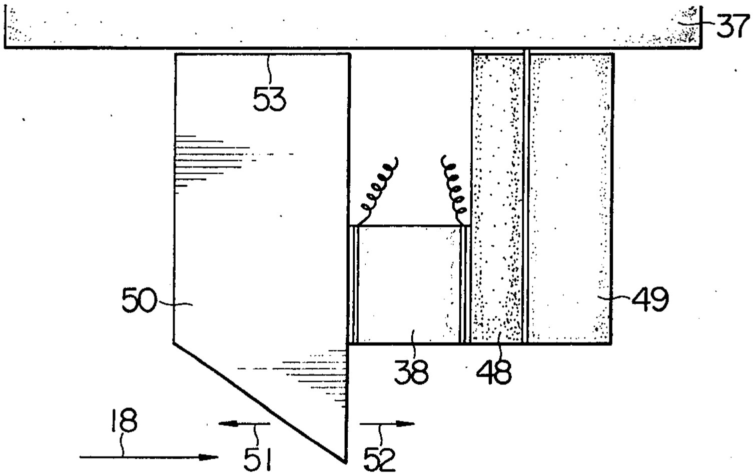

The above and other objects, features and advantages of the present invention will become more apparent from the following detailed description of the preferred embodiments of the invention when taken in conjunction with the accompanying drawings, in which:

FIG. 1 is a fragmentary plane view illustrating an example of a video disc applied to the present invention, FIG. 2 shows a cross sectional view taken along the line A—A' in FIG. 1, FIG. 3 shows a longitudinal sectional view taken along the line B—B' in FIG. 1, FIG. 4 is a fragmentary perspective view illustrating an example of a record medium used in the present invention, FIGS. 5, 6 and 7 are rear view, side view and top view, respectively, of one embodiment of a reproducing stylus used in the present invention, FIGS. 8, 9 and 10 are enlarged views of major parts, respectively, of FIGS. 5, 6 and 7, FIG. 11 a side elevational view illustrating an example of a pickup device, FIG. 12 is an enlarged view of a major part of FIG. 11, FIGS. 13A and 13B, 14A and 14B are side elevational views and bottom views, respectively, of major parts for illustrating the operation of the present invention, FIG. 15 is a side elevational view of a major part of another embodiment of the present invention, FIG. 16 is a side elevational view of a major part for illustrating the operation of the present invention, and FIGS. 17 and 18 are side elevational views of major parts, respectively, showing other embodiments of the present invention.

First, the record medium used in the present invention is generally explained. A video signal to be recorded is FM modulated with a carrier frequency of 4.3–6.3 MHz while an audio signal is also FM modulated with a frequency of 700 KHz or so and these FM modulated signals are mixed to perform a duty cycle modulation.

It has been proved by studies by the inventors that a minimum recording wavelength which assures high quality reproduction of picture images under the reproducing system of the present invention is approximately 0.5 μ m at the present stage while a minimum record groove pitch for that purpose is approximately 4 μ m. Therefore, if the final structure of the video disc has a diameter of 30 cm and a thickness of 0.8–2mm like an LP record disc and it is rotated at 450 r.p.m., a video disc is obtained permits reproduction of a color video signal and an audio signal with a playback time of 30 minutes for one side and one hour for both sides.

In one method of manufacturing such a disc, a spiral groove having a pitch of approximately 4 μ m and which is generally triangular in cross section is formed on the surface of a metal substrate, and photoresist material which is sensitive to an electron beam is applied thereon. The cross section thus assumes a generally arcuate shape. The substrate is then placed in a vacuum and an electron beam swung transversely to the length of the groove while the intensity thereof is varied with the FM signal. The electron beam is controlled so that the center thereof always coincides with the center of the groove. Thereafter the photoresist is developed, resulting in a recessed pattern at portions on which the electron beam impinged. FIG. 1 shows a top view of the developed pattern. In the drawing, 1 designates a recessed portion engraved by the exposure to the electron beam and 3 designates the remaining photoresist. FIG. 2 shows a cross sectional view of the groove taken along the line A—A' in FIG. 1. In FIG. 2, 4 designates the top of the groove, 8 designates the deepest portion of the groove, 5 the profile of the engraved signal pattern 1, 3 the remaining photoresist and 6 a metal substrate. FIG. 3 shows a longitudinal sectional view taken along the line B—B' in FIG. 1 and respective portions in the figure correspond to respective ones in FIG. 2. The depth of the engraved signal pattern 1 is preferably 0.15 $\mu$ m or so.

From this original disc, it is possible to manufacture video discs made of vinyl chloride by mass production methods using exactly the same techniques as used in the manufacture of audio record discs.

FIG. 4 shows an enlarged perspective view of a portion of the disc thus produced. In the figure, 1 designates the engraved signal pattern, and 23 and 24 constitute zero crossing signals for the FM signal. 4 designates the top of the groove which is the highest portion of the groove and delineates the groove.

And, as apparent from FIG. 4, the upper surface of a relief signal is so constructed as to be almost a straight line against a scanning direction independently of the signal interval.

In addition to the above recording method, the present invention is also applicable to a record medium manufactured by what is generally called the mechanical cutting method. In this case the FM signal is reproduced by detecting the projecting end of the relief signal pattern and the intervals of the following projecting ends.

A basic principle of operation of the recording system of the present invention will now be described.

The reproduction from the recorded disc is effected by a reproducing stylus made of a hard material such as diamond, as shown in FIGS. 5, 6 and 7 and a mechanical-electrical transducer (not shown) such as a piezoelectric element coupled to the top of the reproducing stylus.

FIGS. 5–7 show the reproducing styluses, in which 9 designates a plane coupled to the piezoelectric element, and the apex 10 of a tetrahedron constructed by planes 14, 15 and 16 scans the disc. FIGS. 8, 9 and 10 show enlarged views of portions encircled by circles 11 of FIGS. 5, 6 and 7, respectively. In FIGS. 8, 9 and 10, 17 designates a scanning surface and it is of triangular shape as best seen from FIG. 10, the dimensions thereof being 2–4 $\mu$m along a side 20, and 2–6 $\mu$ m from side 20 to 19. Since the disc is moved in the direction of the arrow 18 in the figure, the recorded signal is transmitted from the apex 19 of the triangle on the scanning surface to the rear edge 20. The stylus pressure is around 30 mg.

The stylus pressure may be applied in the manner shown in FIG. 11. That is, the needle pressure is applied to a reproducing stylus 39 by a coiled spring 32 having one end thereof fixed to a fixed point 31 through a compliance arm 33, an elastic member 35, a cantilever 36, a cushion 37 for a piezoelectric element and the piezoelectric element 38. As shown in FIGS. 6 and 9, the reproducing stylus 39 is constructed such that the trailing side 14 and the contact surface 9 with the piezoelectric element are substantially perpendicular to each other. 34 designates an arm which prevents the arm 33 from descending beyond a predetermined position. With such an arrangement, when the stylus pressure is applied, the cushion 37 for the piezoelectric element, which is made of a rubber material having lower elastic hardness than those of the reproducing stylus 39 and the piezoelectric element 38, deforms as shown by 37 in FIG. 12. That is, a compression force in the direction shown by arrow 41 is applied to the trailing side while an expansion force in the direction shown by arrow 42 is applied to the leading side. Under such conditions, when the engagement of the disc 40 and the reproducing stylus is suddenly released, the reproducing stylus 39 tends to abruptly restore in the direction of arrow 43. On the other hand, as seen from FIGS. 13A and 13B, the bottom surface of the reproducing stylus supports the stylus pressure of 30 mg by the portions 25, 26 on the groove surface. As the disc moves in the direction of arrow 18 to assume the state shown in FIGS. 14A and 14B, the trailing edge 20 of the scanning surface 17 of the reproducing stylus moves off the groove surface and engages into the recessed signal portion 5, and the reproducing stylus inclines by an angle shown by 27 in FIG. 14 by the restoring force, reducing the force applied to the piezoelectric element in the direction of arrow 29. At this time, a zero-crossing signal is produced. As the disc further moves to bring the trailing edge 20 onto the groove surface 8, the pressure to the piezoelectric element restores the element to the same state as in FIG. 13. The scanning surface of the reproducing stylus makes contact with two to eight relief signal segments depending on the length of the surface and the recording wavelength, and the inclination of the surface changes with the signal but the entire scanning surface does not drop into the engraved signal pattern. Further distortion of the recorded signal by the scanning surface does not occur.

While an example has been shown in which the scanning surface of the reproducing stylus 39 and the disc are set in parallel with each other, the scanning surface 17 may be intentionally inclined with respect to the disc by an angle shown by 30 as shown in FIG. 15 to form a leading surface 17' for enhancing the reproduced signal. In this case the scanning surface 17 makes contact with the disc only near the trailing edge 20.

In order to reduce the wear of the disc and the reproducing stylus and to reduce the noise in the reproduced signal, it is effective to apply to the disc silicone oil in the thickness of about 600 A. The silicone oil may be conveniently GE-SF1147 and the same reproducing principle as set forth above can be applied because the elasticity of the silicone oil is much smaller than that of the disc.

Having described the basic principle of the reproduction in accordance with the present invention, a positional relationship between the reproducing stylus and the mechanical-electrical transducer for enabling more effective detection of the reproducing signal will be disclosed.

In the arrangement shown in FIG. 12, as seen from the previous description, when the reproducing stylus in the state shown in FIG. 13, the stylus pressure 41 is applied downwardly to the right side of the piezoelectric element 38 as viewed in the figure; that is, to the trailing side of the reproducing stylus while the reproducing stylus applies a counter force 44 of the disc in the direction shown by the arrow 44 so that they counterbalance each other. On the other hand, as stated above, because of the shape of the reproducing stylus, at the left side of the reproducing stylus as viewed in the figure; that is, on the leading side of the reproducing stylus, the tensile force of the cushion 37 for the piezoelectric element, shown by arrow 42, and the downward tensile force of the reproducing stylus, as shown by arrow 45, balance each other. This results in a compression force on one side of the piezoelectric element and a tensile force on the other side thereof. When the reproducing needle next assumes a state as shown in FIG. 14, the compression force 44 and the tensile force 45 suddenly decrease and the change in the force occurs in the direction of compressing the piezoelectric element on the leading side and in the direction of expansion on the trailing side. These forces interact to cancel each other within the piezoelectric element. It is, therefore, not always the best way for detecting the reproducing signal efficiently to couple to the piezoelectric element on the contact surface 9 as shown in FIG. 12.

The inventors conducted the following experiment to prove the above fact. As shown in FIG. 16, two piezoelectric elements 46 and 38 were arranged on the leading side and the trailing side, respectively, with their polarization being set in the same direction, and the reproducing stylus 39 was mounted thereon.

The signal reproduced by the above pickup was compared with the signal by a prior art device, with the result that the piezoelectric element 38 could reproduce a high quality signal in the range of 1–10 MHz. The quality of the output was equal to or better than that of the previously explained system and a reproduced picture image with higher signal to noise ratio than in the previously explained system was obtained.

On the contrary, the piezoelectric element 46 on the leading side could produce a good quality signal only between 4 and 7 MHz and an abrupt phase shift occurred near 6 MHz. From the above results of the experiment, it is seen that the diamond reproducing stylus 39 is not regarded as a single rigid body at such a high frequency but it should be considered as an elastic member which elastically deforms. Hence, the preferable mounting position of the piezoelectric element 38 is immediately above the trailing side.

Based on the finding of the above principle and the results of the experiment, the inventors have invented a reproducing system which can more effectively detect the change in the inclination angle as an electrical signal, as illustrated by major parts thereof in FIGS. 17 and 18.

A feature of the structure shown in FIG. 17 lies in that the coupling between the reproducing stylus 39 and the piezoelectric element 38 is limited to one portion and the remaining portion is supported by the other member 47 to the cushion 37 for the piezoelectric element, which elastically deforms. The material of the member 47 may vary from a hard material such as diamond to an elastic material such as rubber, and rubber is most preferable. The coupling area between the reproducing stylus and the piezoelectric element is preferably as small as possible provided that the piezoelectric element can be sufficiently held. They are easily assembled by an appropriate bonding method.

With the structure of FIG. 17, as stated above, the signal to noise ratio for the reproducing signal is improved, the signal output voltage increases to about 1.5 times as high as that of the previously explained system and the resonant frequency becomes higher because the loading effect of the reproducing stylus decreases. Furthermore, in manufacturing, since only a portion of the piezoelectric element is coupled to the reproducing stylus, the lead can be easily attached to the remaining portion of the piezoelectric element.

The structure of FIG. 18 resolves a problem which is encountered in the structure of FIG. 12 and hence should be eliminated. In the structure of FIG. 12, the pressure for causing the reproducing stylus to contact the disc (that is, the stylus pressure) is applied through the piezoelectric element so that a biasing force is always applied to the piezoelectric element. As a result it is difficult to use a linear portion of the transducing characteristic of the piezoelectric element. Further, a vertical vibration due to the changes in signal segment height and the unevenness on the signal segment increases, which vertical vibration in turn is applied to the piezoelectric element together with the stylus pressure, resulting in an increase of the cross modulation and deterioration in the signal to noise ratio.

Referring to FIG. 18, 37 designates an elastic member such as rubber, of a similar construction to that of FIG. 12, which supports the reproducing stylus 50 and others to absorb the vibration transmitted from the disc and to supply elastic energy due to the stylus pressure to the reproducing stylus, as stated above. The reproducing stylus 50 is directly mounted on the elastic member 37 and the piezoelectric element 38 is mounted on a portion of the reproducing stylus; that is, in the illustrated embodiment on the trailing side of the reproducing stylus with respect to the direction of disc travel (arrow 18). On other side of the piezoelectric element 38, an elastic member 48 which may be made of rubber is mounted and a support 49 therefor is mounted outwardly. The elastic member 48 and the support 49 are not always necessary. The sliding surface of the reproducing stylus may be constructed in the same manner as the previous embodiment.

The function of the above construction is explained in conjunction with FIG. 18. When a stylus pressure of about 30–80 mg is applied to the reproducing stylus 50 through the elastic member 37, because of the shape of the end of the reproducing stylus as stated above the reproducing stylus slightly inclines in the direction of the arrow 52 in the figure and stores a counter force in the direction of the arrow 51. Like the previous case, at the moment when the scanning surface of the reproducing stylus changes from the state of FIG. 17 to the state of FIG. 14, the stylus rapidly moves in the direction of the arrow 51, and as it restores the state of FIG. 13 it moves in the direction of the arrow 52. Due to the above movement of the reproducing stylus 50, a force is applied to the piezoelectric element 38 bonded to the side of the reproducing stylus, as seen from the figure, producing an electrical signal.

The present embodiment has many advantages, major ones of which are given below.

Since a static pressure is not applied to the piezoelectric element because the stylus pressure is transmitted to the reproducing stylus, not through the piezoelectric element but directly, a highly linear portion in the piezoelectric transducing characteristic can be employed, and the undesired vertical movement described above is applied to the piezoelectric element as a shearing stress while a signal detecting force functions as a compression force, affording no adverse affect on the reproduced signal. Furthermore, there is no risk of the deterioration of the characteristic of the piezoelectric element by an accidental large impact afforded by the disc.

The shape and size of the reproducing stylus can be more freely designed that in the structure of FIG. 12. In FIG. 12, each side of the triangular reproducing stylus shown in FIGS. 5–7 needs to be formed into the length of about 100 $\mu$ m, but in the present embodiment each side may be longer than 200 $\mu$ m. In this dimensional range the above difference brings about considerable manufacturing advantages. This enables the use of sapphire instead of diamond, which sapphire heretofore could not be used because of the difficulty in manufacturing. Except the tip end, any shape may be employed. On the other hand, in the structure of FIG. 12, since the plane 9 in FIGS. 5 and 6 is bonded to the piezoelectric element this plane should be as flat as possible and the size thereof needs to be similar to that of the piezoelectric element.

The shape of the reproducing stylus which can be effectively used in the reproducing system of the present invention is now described.

Unlike the audio signal, the video signal must be recorded and reproduced in a high frequency range, and as a result the relative speed between the record medium and the signal transducer needs to be high, such as 3–20 m/sec, and the engraved pattern needs to be of high density. As a result, the contact between the signal transducer and the record medium during reproduction is unstable accordingly fine dust on the record medium may cause a problem, and the scanning member must be scanned in a stable manner along the shallow and high density record guide groove as stated above.

On the other hand, in the scanning member in accordance with the present invention, as shown in FIGS. 5–10, the width of the scanning surface 17 which contacts with the record medium, measured in the direction transverse to the direction of travel of the record medium, gradually increases towards the trailing side 20 so that a stable movement along the signal groove can be expected.

When the composition usually used for the audio record disc which consists of about 93 percent resin, about 6 percent plastics, the resin primarily consisting of vinyl chloride, and vinyl acetate being about 14 percent of the resin, was used as a disc material, the contact between the reproducing stylus and the signal recording section was rendered unstable during the experiment by fine particles of the disc material which were chipped from the disc by the recording stylus and deposited on the reproducing stylus. As a result, the reproduced picture image included a lot of noise and the signal output was reduced. The above phenomenon is considered to be caused by the fact that the reproducing stylus makes contact with the signal groove on the bottom surface thereof in the present system and not on the side wall thereof as in the case of the audio record disc.

After extensive experiment on the shape of the reproducing stylus, the inventors have found that a prow angle of the reproducing stylus with the disc; that is an angle $\theta$ in FIGS. 6 and 9 played an important role. From experiments on reproducing styluses of different angle $\theta_1$, it has been determined that the angle of 70° to 0°, preferably around 45° was effective to reduce the noise and to enhance the signal output, and at the same time made the stylus easy to manufacture. Explaining the above with an enlarged view, it is meant that the angle $\eta_2$ the scanning surface 17 makes with the edge 22 of the tetrahedron in FIGS. 6 and 9 should be no more than 160°.

With the above construction, more stable contact between the signal transducer and the record medium can be provided, bringing about a remarkable effect when used with a video disc of high relative speed and high recording density.

A record medium which is effective when used in the reproducing system of the present invention will now be explained.

As the disc material, a material usually used for the audio record disc, which consisted of about 93 percent resin and about 5 percent plastics, the resin primarily consisting of vinyl chloride, and vinyl acetate being about 14 percent of the resin, was used as described above. During the experiment, the contact between the reproducing stylus and the signal recording section was rendered unstable by fine particles of the disc material which were chipped from the disc and deposited on the reproducing stylus. This resulted in considerable noise in the reproduced picture image as well as reduction of the signal output level. The above phenomenon is considered to be caused by the fact that the reproducing stylus makes contact with the signal groove on the bottom surface thereof in the present system and not on the sidewall thereof as in the case of the audio record disc.

After the trial and experiment using various materials, the inventors have found that the elongation percentage of the material plays an important role in resolving the above problem. While the audio record disc uses a material having a compression elastic modulus of about 300 kg/mm$^2$ and an elongation percentage of substantially zero, the experiment by the inventors has proved that a satisfactory result is obtainable by use of a thermoplastic resin having the same compression elastic modulus, which was required to prevent the deformation of the material, and the elongation percentage of 10–130 percent, preferably more than 30 percent. The term "elongation percentage" denotes the elongation up to fracture when the material is extended. Such material is available as a pressed sheet or blank sheet. It can be cut into a proper size and can be readily pressed by a prior art pressing machine for the audio record disc. The reason for the satisfactory result by the use of the material having the elongation percentage of 10–130 percent is considered as follows: As stated above, since the video disc is rotated at a high speed which is more than 10 times as high as that of the audio record disc, the relative speed is very high. As a result, if the material of of the audio record is assumed to be of rubber clay, it follows that the present invention used chewing gun-like material having a similar compression elastic modulus and a very high elongation percentage, for the video disc. Accordingly, even when the pressure by the signal transducer and rubbing force thereby are simultaneously applied to the disc, it is strong enough to prevent the creation of powder.

What is claimed is:

1. A signal reproducing device for use with a uniformly rigid record medium formed with a guide groove having an uneven pattern formed on at least the bottom thereof with projections of the signal segment being located at intervals corresponding to a modulated recorded signal, said device comprising:

an elastic support member, a scanning member including a first surface substantially parallel to said record medium, a trailing surface inclined at a first angle with respect to said record medium and a leading surface inclined at a second angle with respect to said record medium, the line forming the intersection of said trailing surface and said leading surface forming a trailing edge extending transverse to said guide groove, and a mechanical-electrical transducing element interposed between said elastic support member and said scanning member, said trailing edge pressing said record medium along said guide groove without substantial deformation of said record medium, changes in the inclination angle of said scanning member with respect to said record medium caused when said trailing edge engages with or disengages from said projections being detected by said mechanical electrical transducing element to produce a reproduced electrical signal.

2. A signal reproducing system according to claim 1 wherein at least a portion of the first surface of said scanning member is secured to said mechanical-electrical transducing element.

3. A signal reproducing device as defined by claim 2 whrein a further support member is interposed together with said mechanical-electrical transducing element between said elastic support member and said scanning member, a first portion of said scanning member being secured to said mechanical-electrical transducing element and a second portion of said scanning member being secured to said further support member.

4. A signal reproducing system according to claim 1 wherein the first surface of said scanning member is secured to said elastic support member, and wherein the trailing surface of said scanning member is secured to said mechanical-electrical transducing element.

5. A signal reproducing system according to claim 1 wherein said record medium is formed by a thermoplastic resin material having an elongation percentage of no less than 10 percent, the elongation percentage denoting the elongation resulting in fracture of said thermoplastic material when it is extended.

6. A signal reproducing system, comprising:

a uniformly rigid record medium formed with a guide groove having an uneven pattern formed on at least the bottom thereof with projections of the signal segment being located at intervals corresponding to a modulated recorded signal, said record medium being composed of substantially only a resin material, an elastic support member, a scanning member including a first surface substantially parallel to said record medium, a trailing surface inclined at a first angle with respect to said record medium and a leading surface inclined at a second angle with respect to said record medium, the line forming the intersection of said trailing surface and said leading surface forming a trailing edge extending transverse to said guide groove, and a mechanical-electrical transducing element interposed between said elastic support member and said scanning member, said trailing edge pressing said record medium along said guide groove without substantial deformation of said record medium, changes in the inclination angle of said scanning member with respect to said record medium caused when said trailing edge engages with or disengages from said projections being detected by said mechanical-electrical transducing element to produce a reproduced electrical signal.

7. A signal reproducing system, comprising:

a uniformly rigid record medium formed with a guide groove having an uneven pattern formed on at least the bottom thereof with projections of the signal segment being located at intervals corresponding to a modulated recorded signal, said record medium being composed of substantially only a resin material, an elastic support member, a scanning member including a first surface substantially parallel to said record medium, a trailing surface inclined at a first angle with respect to said record medium and a scanning surface extending parallel to said record medium for making contact therewith, the width of said scanning surface in a direction transverse to said groove increasing toward the trailing surface of said scanning member, and a mechanical-electrical transducing element interposed between said elastic support member and said scanning member, said trailing edge pressing said record medium along said guide groove without substantial deformation of said record medium, changes in the inclination angle of said scanning member with respect to said record medium caused when said trailing edge engages with or disengages from said projections being detected by said mechanical electrical transducing element to produce a reproduced electrical signal.

8. A signal reproducing system according to claim 7 wherein at least a portion of the first surface of said scanning member is secured to said mechanical-electrical transducing element.

9. A signal reproducing system according to claim 7 wherein the first surface of said scanning member is secured to said elastic support member, and wherein the trailing surface of said scanning member is secured to said mechanical-electrical transducing element.

* * * * *